United States Patent
Hofmann et al.

(10) Patent No.: US 7,513,177 B2
(45) Date of Patent: Apr. 7, 2009

(54) WIRE STRIPPER WHICH CAN BE AUTOMATICALLY ADAPTED TO DIFFERENT CONDUCTOR CROSS SECTIONS

(76) Inventors: Horst Hofmann, Hauptstrasse 52, D-98587 Unterschönau (DE); Edgar Wilhelm, Arzberg 4, D-98587 Altersbach (DE)

( * ) Notice: Subject to any disclaimer, the term of this patent is extended or adjusted under 35 U.S.C. 154(b) by 320 days.

(21) Appl. No.: 10/586,787

(22) PCT Filed: Jan. 24, 2005

(86) PCT No.: PCT/IB2005/000977
§ 371 (c)(1), (2), (4) Date: Jul. 21, 2006

(87) PCT Pub. No.: WO2005/071811
PCT Pub. Date: Aug. 4, 2005

(65) Prior Publication Data
US 2008/0229884 A1    Sep. 25, 2008

(30) Foreign Application Priority Data
Jan. 22, 2004    (DE)    .................. 10 2004 003 462

(51) Int. Cl.
 *H02G 1/12*    (2006.01)
(52) U.S. Cl. ........................ 81/9.43; 81/9.41
(58) Field of Classification Search ........... 81/9.4–9.44, 81/9.51; 30/90.1
See application file for complete search history.

(56) References Cited
U.S. PATENT DOCUMENTS 4,341,134 A * 7/1982 Yamazaki et al. ............ 81/9.41
4,485,696 A * 12/1984 Bieganski .................. 81/9.41
5,491,894 A * 2/1996 Bieganski .................. 30/90.1
5,572,911 A * 11/1996 Schmode et al. ............. 81/9.43
5,724,871 A * 3/1998 Wall .......................... 81/9.43
6,220,119 B1 * 4/2001 Krampe ...................... 81/9.43

FOREIGN PATENT DOCUMENTS

DE    4420050    8/1995
DE    4420006    12/1995
EP    0 645 861 A2    3/1995

* cited by examiner

*Primary Examiner*—Joseph J Hail, III
*Assistant Examiner*—Anthony Ojini
(74) *Attorney, Agent, or Firm*—Mayer & Williams PC; Mark Wieczorek

(57) ABSTRACT

The invention relates to wire-stripping pliers with an automatic adaptation to various wire gauges and insulation thicknesses that has two pairs of pivotable jaws of which the jaws of the first, outer pair are configured as gripper jaws and are pivotable by means of a first jaw arm and a jaw part about a common point, and the jaws of the other, inner pair are configured as cutting jaws with blades that cut into the insulation, and with a pull rod attached to the cutter jaws and longitudinally moveable within the jaw body providing the stripping motion that is coupled with a second plier arm. At least one sliding wedge is mounted in a recess shaped to match the sliding wedge within the first plier arm or in the jaw part, whereby a first sliding wedge facing the cutting jaws is flat and a second sliding wedge resting in the recess is so shaped that the separation between both sliding wedges at a central area of the sliding wedge diminishes toward at least one of the two sliding wedge ends. Under this configuration, opening the insulation-stripping jaws causes longitudinal displacement of the sliding wedge along with simultaneous matching of position of the sliding wedge perpendicular to the longitudinal direction that results in cutting-depth adjustment of the cutting jaws and the cutting blade attached to it.

9 Claims, 6 Drawing Sheets

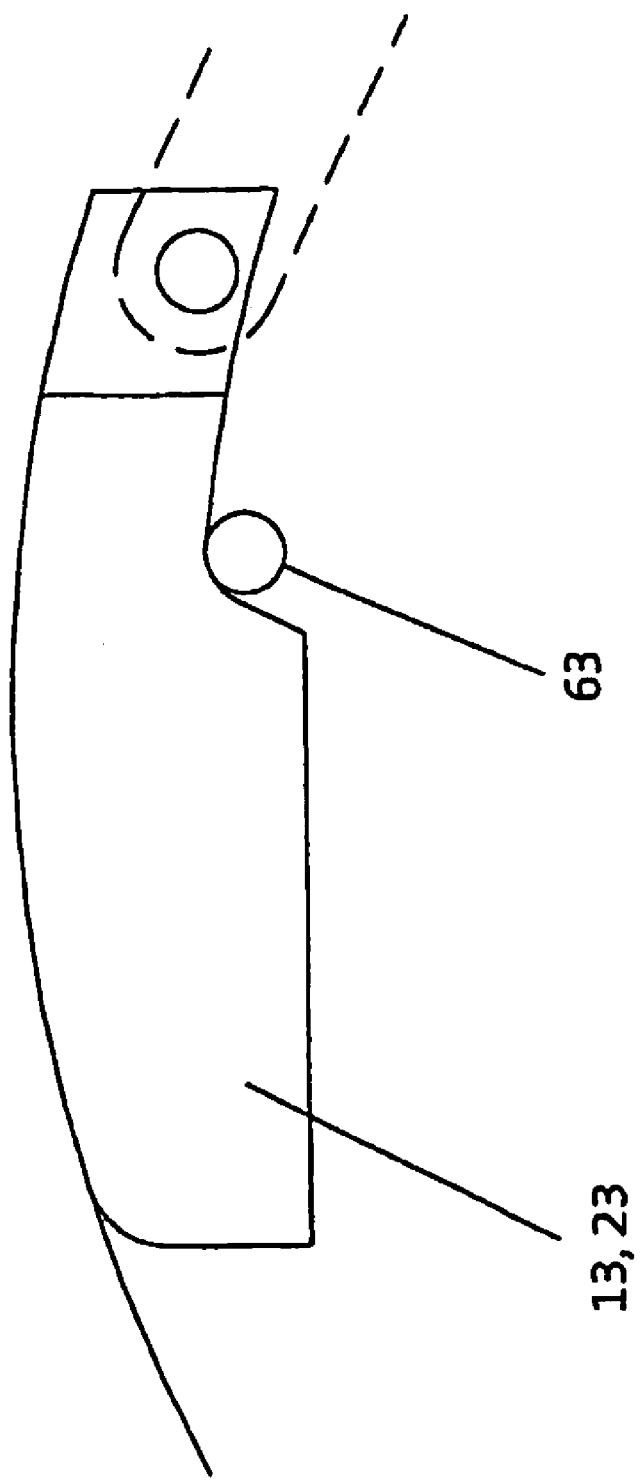

WIRE STRIPPER WHICH CAN BE AUTOMATICALLY ADAPTED TO DIFFERENT CONDUCTOR CROSS SECTIONS

BACKGROUND OF THE INVENTION

The invention relates to a wire-stripping plier with an automatic adaptation to various wire gauges and insulation thicknesses with two pairs of pivotable jaws of which the jaws of a first, outer pair are configured as gripper jaws and that are pivotable by means of a first jaw arm and a jaw part about a common point, and the jaws of the other, inner pair that are configured as cutting jaws with blades that cut into the insulation, and with a pull rod attached to the cutter jaws and longitudinally moveable within the jaw body providing the stripping motion that is coupled with a second plier arm.

There are many pliers and similar hand tools used to strip the insulation from electric cables. Compared with traditional cable cutters, adjustable or pre-set wire-stripping pliers offer improved safety for the user and for the cable material. In order to maintain a high-quality connection, it must be ensured that the electrical conductor (single or multi) remains undamaged during stripping. For this, the most important issue is that the sheathing at the end of the cable, and of the individual conductors, may be removed in the contact area cleanly and at the proper length. The great advantage of a conventional automatic wire-stripping plier is the option of pre-cutting and then stripping the insulation in one step by means of further compression of the plier handgrips. Adaptation to varying insulation and cable thicknesses had to be achieved via manual adjustment of the plier, or by provision of multiple blades of varying shapes. Improper operation or adjustment always presented a hazard of conductor damage.

For example, DE 44 20 006 A1 describes a plier to strip conductor ends with an outer pair of holding jaws and inner pair of cutting jaws. Limited adaptation to the wire gauge is achieved by means of the resistance that the holding jaws encounter when compressed. For cables of very small gauge, the compression is limited by an additional limiter. However, adaptation to varying thicknesses of insulation materials was not possible. The danger arises that hard insulation is cut too shallowly, or soft insulation is cut too deep. The result may be that irregularities arise to the cable to be stripped, or to an individual conductor.

EP 0 645 861 A2 describes a stripping plier with two pair of pivotable jaws from which the jaws of the outer pair are implemented as gripper jaws and the jaws of the other, inner pair are implemented as cutter jaws with blades that cut into the insulation. Adaptation to varying conductor gauges and insulation thicknesses is enabled via a cam. By rotating the cam, the user may alter the position the lower cutter jaw and thereby that of the corresponding cutter blade.

DE 44 20 050 C1 describes a wire-stripping plier in which at least one cutter jaw includes a packet of adjacent strips with cutter edges moveable perpendicular to the jaws longitudinal direction that, when the plier is closed, press into the insulation. The strips are supported by means of a clamp arm with a V-shaped recess. Adaptation to varying conductor gauges is performed in that the recess is narrower or wider. To strip conductors of varying gauges, it is necessary to provide clamp arms with varying recesses that must be selected by the user and inserted into the wire-stripping plier.

SUMMARY OF THE INVENTION

It is the task of this invention to improve a wire-stripping plier so that automatic adaptation of cutting depth is simply achieved for varying wire gauges, insulation thickness, and insulation material.

This task is solved by the wire-stripping plier based on the invention in which at least one sliding wedge is mounted in a recess of the first plier arm matching the shape of the sliding wedge, whereby a sliding-wedge surface facing the cutter jaws is flat and a second sliding wedge resting within the recess is so shaped that the separation between both sliding wedges diminishes from a central area of the sliding wedge toward at least one of the two sliding wedge ends. When the wire-stripping plier is opened, the sliding wedge is displaced longitudinally with simultaneous matching of position of the sliding wedge perpendicular to the longitudinal direction that results in cutting-depth adjustment of the cutting jaws and the cutting blade attached to it.

Use of such a sliding wedge enables simple adjustment of the cutter jaws to match the cut depth into the insulation. Depending on whether a matching sliding wedge is in the first plier arm, the jaw part, or in both elements, either one or both cutter jaws is adjustable. Proper shaping of the second sliding wedge mounted in the recess of the first plier arm or jaw part enables manufacturer-side basic matching to the cutter depths required for varying insulation materials.

The wire-stripping plier based on the invention provides automatic adaptation of the cutter-jaw cut depth for wire gauges within the range of about 0.5 mm$^2$ to 10 mm$^2$.

Based on a particularly advantageous embodiment of the invention, a first sliding wedge in a recess of the first plier arm and a second sliding wedge of the same shape within a recess of the jaw part. A bowed shape has proved particularly suitable for the second surfaces of the sliding wedge. This includes a diminishing of the separation between the two sliding wedges. In this embodiment example, both cutter jaws have adjustable depth, whereby a clean cut from all sides is ensured. In varying embodiment examples, the second surfaces may also possess a different progression, e.g., oblique to the plane the first sliding wedge so that a sliding wedge that is wedge-shaped only on one side results.

It is useful if, in another embodiment example, the side of the cutter jaws facing the sliding wedge include a first and a second projection. The first projection provides a point-type positioning of the cutter jaw on the sliding-wedge surface. Since only such positioning exists between cutter jaws and sliding wedge and not a full positioning, the friction of the cutter jaws on the sliding wedges is minimized, thus ensuring smooth displacement of the sliding wedges.

Based on another embodiment example, the gripper jaws each possess a raised gripper tooth, preferably on the end of the gripper jaw facing the cutter jaw. The raised gripper tooth and the cutter blade include mirror-image cutter steps. When the plier is closed, the raised gripper tooth cuts slightly into the cable, whereby additional positioning of the insulation remaining on the cable is achieved.

In another useful embodiment of the invention, a slight longitudinal displacement of the sliding-wedge surfaces with respect to each other is achieved by the shape of the second surface. This causes a slight opening of the plier jaws as the cutter jaws move. This can compensate for irregularities in the cable to be stripped, thus preventing damage to the conductors.

It is further advantageous to attach the cutter blades to the cutter jaws so that they may be removed. The cutter blades are preferably screwed onto the front sides of the cutter jaws facing the gripper jaws. Thus, they may be easily replaced when worn, or replaced by other cutter blades suited to the application. The use of shaped blades is also conceivable when harder insulation materials such as Teflon is to be processed.

The gripper jaws are preferably mounted in receiver jaws so that they may be removed. These jaws may also be simply exchanged in case of wear. Additionally, the height of the gripper jaws may be adjusted, whereby adaptation of the impression depth is possible.

BRIEF DESCRIPTION OF THE FIGURES

Further advantages, details, and embodiments are provided in the following description of an advantageous embodiment of the wire-stripping plier with reference to the Figures:

FIG. 6a is a detailed view of the sliding wedge with positional securing.

DETAILED DESCRIPTION OF A PREFERRED EMBODIMENT

Figure 1:
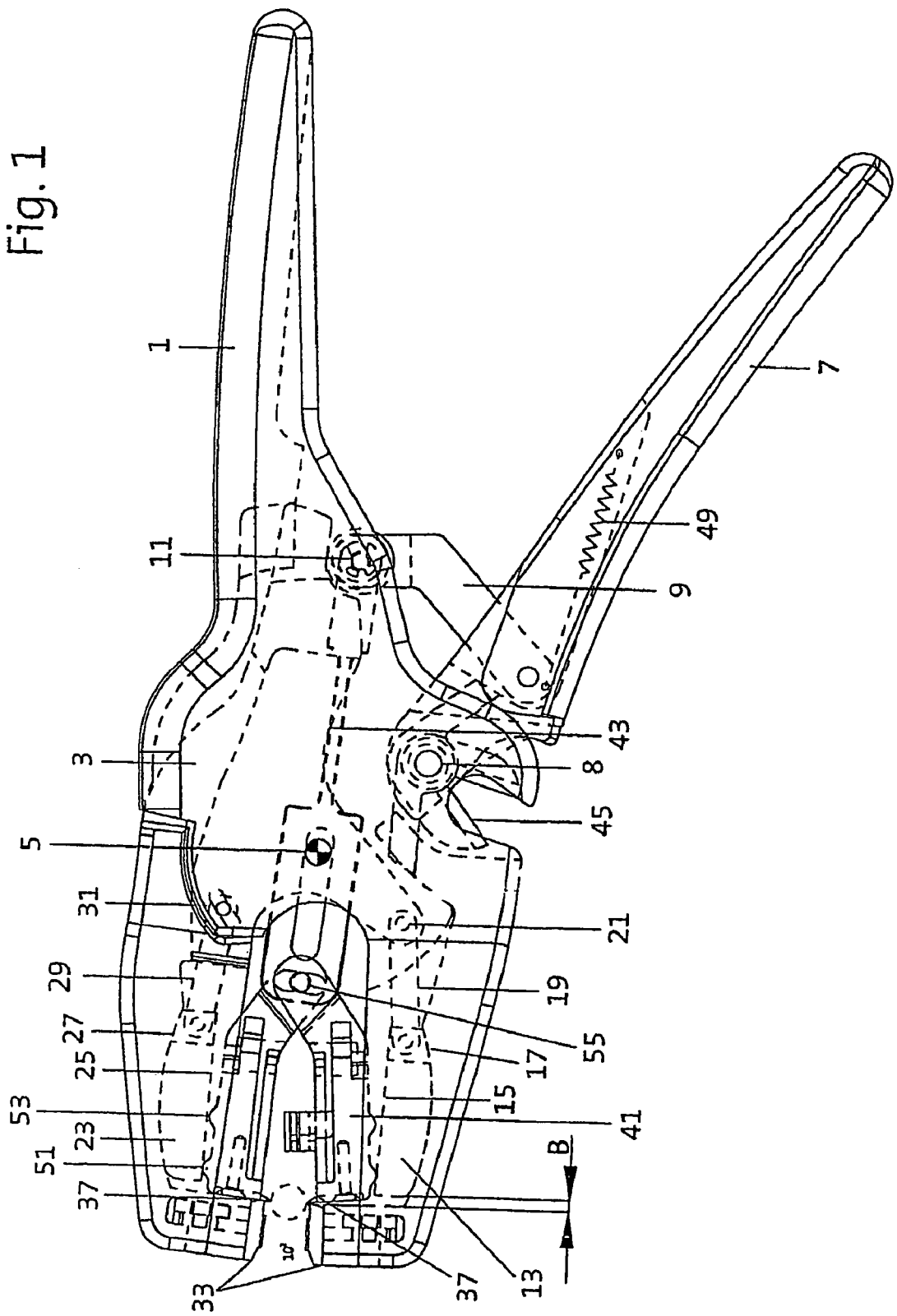
FIG. 1 is an overall view of a wire-stripping plier based on the invention with opened jaws.

FIG. 1 shows a wire-stripping plier based on the invention with opened jaws in an overall view. The wire-stripping plier includes a first plier arm 1 and a jaw part 3, which possess a common pivot point 5. A second plier arm 7 that is connected via a lever pivot axis 8 with the first plier arm acts via a link 9 with a roller 11 on the jaw part 3 so that the plier jaws are also closed by a closing movement of the plier arms.

A first sliding wedge 13 with a sliding-wedge surface 15 facing the plier jaw opening is located in a recess in the first plier arm, and a second surface 17 is also in the recess. The first sliding wedge 13 is connected with the jaw part 3 via a first coupling rod. A first pin 21 serves to secure the first coupling rod 19 in the jaw part 3.

A second sliding wedge 23 is mounted within a recess in the jaw part 3. It possesses a sliding-wedge surface 25 facing the plier jaw opening and a second surface 27 in the recess.

The second sliding wedge 23 is connected with the first plier arm via a second coupling rod 29. A second pin 31 serves to provide a firm seat for the second coupling rod 29 in the first plier arm.

The sliding-wedge surfaces 15, 25 facing the jaw opening are flat. The second surfaces 17, 27 lying in the recess are preferably so shaped that the separation between the first and second sliding wedges 15, 17 or 25, 27 diminishes uniformly from a central area of the sliding wedge 13, 23 toward both ends of the sliding wedges 13, 23.

A bowed shape has proved to be particularly advantageous. The recesses serving to store the sliding wedges 13, 23 match the shape of the sliding wedges 13, 23, and also possess a arc-shaped contact area matching the second surfaces.

The wire-stripping plier is further equipped with two pairs of pivotable jaws. The jaws of the first, outer pair are implemented as gripper jaws 33, and are moveable with the first plier arm and the jaw part 3. the jaws of the other, inner pair are implemented as cutter jaws 41 that possess blades 37 that press and cut into the insulation that are attached to the cutter jaws so that they may be removed.

A pull rod 43 that moves longitudinally within the plier body and provides the stripping motion is attached to the cutter jaws 41 and is connected to the second plier arm 7 via the link 9.

Also, a wire cutter 45 to stretch the cable to be stripped is located between the first plier arm 1 and the second plier arm 7. When the plier jaws are closed, the cutter blades of the wire cutter also close, whereby low-effort is enabled by means of the lever action about the lever pivot axis.

The stripping process proceeds as follows: The cable (not shown) is inserted between the gripper jaws 33 so that the desired area to be stripped falls behind the cutter blades 37. Then, as the plier jaws are closed, the second, moveable zg 7 moves toward the first plier arm 1. Thus, pivoting of the jaw part 3 about the pivot point 5 is caused via the link 9 whose one end is attached to the second plier arm 7 and whose other end is attached via the roller 11 to jaw part 3, whereby the plier jaw is closed and the two gripper jaws 33 are pressed firmly against the cable covering. Thus, the cutter jaws 41 are also brought into cutting position as described below in greater detail.

Figure 4:
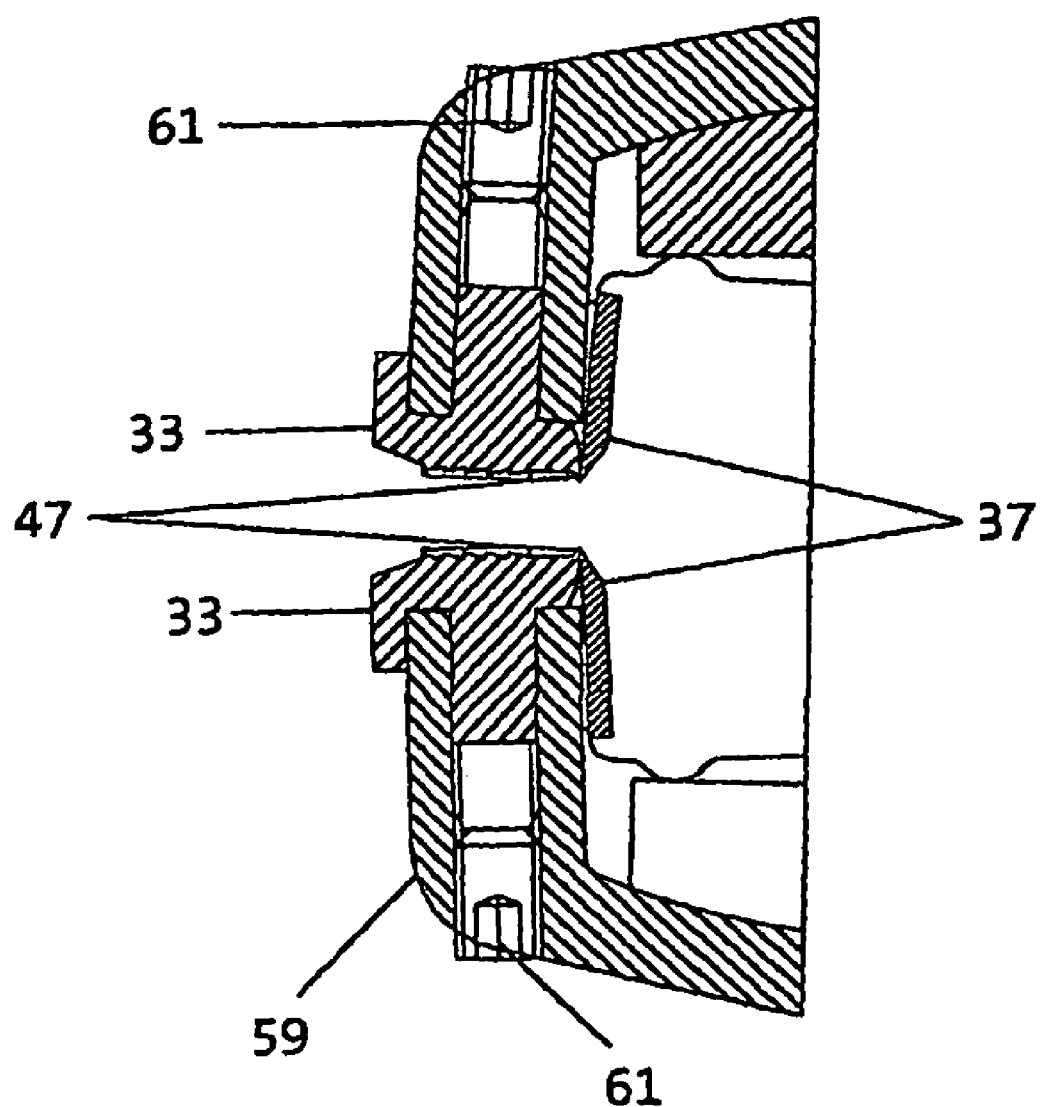
FIG. 4a is a detailed view of the plier jaws.

The gripper jaws 33 preferably each include a raised gripper tooth 47 (see FIG. 4). This raised gripper tooth 47 and the cutter blade 37 possess one-sided mirror-image angled cutting strips. When the gripper jaws 33 are closed, the hfz 47 cuts into the cable covering, providing additional fixing of the insulation remaining on the cable. The resistance that the gripper jaws 33 encounter at the compressed cable prevents further closing.

Figure 2:
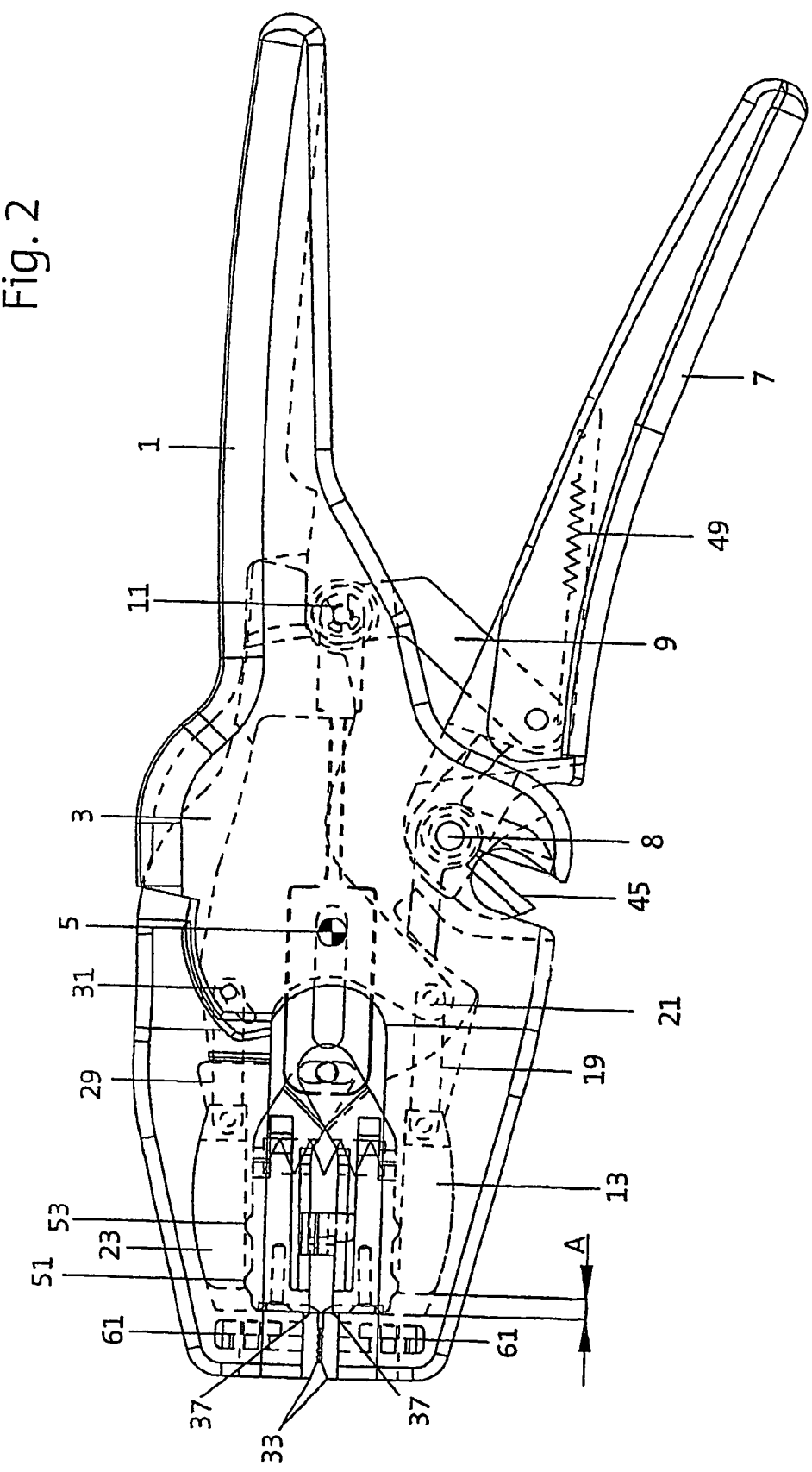
FIG. 2 is an overall view of a wire-stripping plier based on the invention with closed jaws.

Determination of the cutting depth occurs in that, when the plier is further squeezed and the concomitant extension of the jaw part 3 about the pivot point 5, the first sliding wedge 13 is lightly drawn away from the jaw tip. Thus, the first sliding wedge 13 is displaced by an amount that results from the difference in the distances A and B shown in FIGS. 1 and 2 between the front end of the sliding wedge and the front rest edge in the recess.

Figure 3:
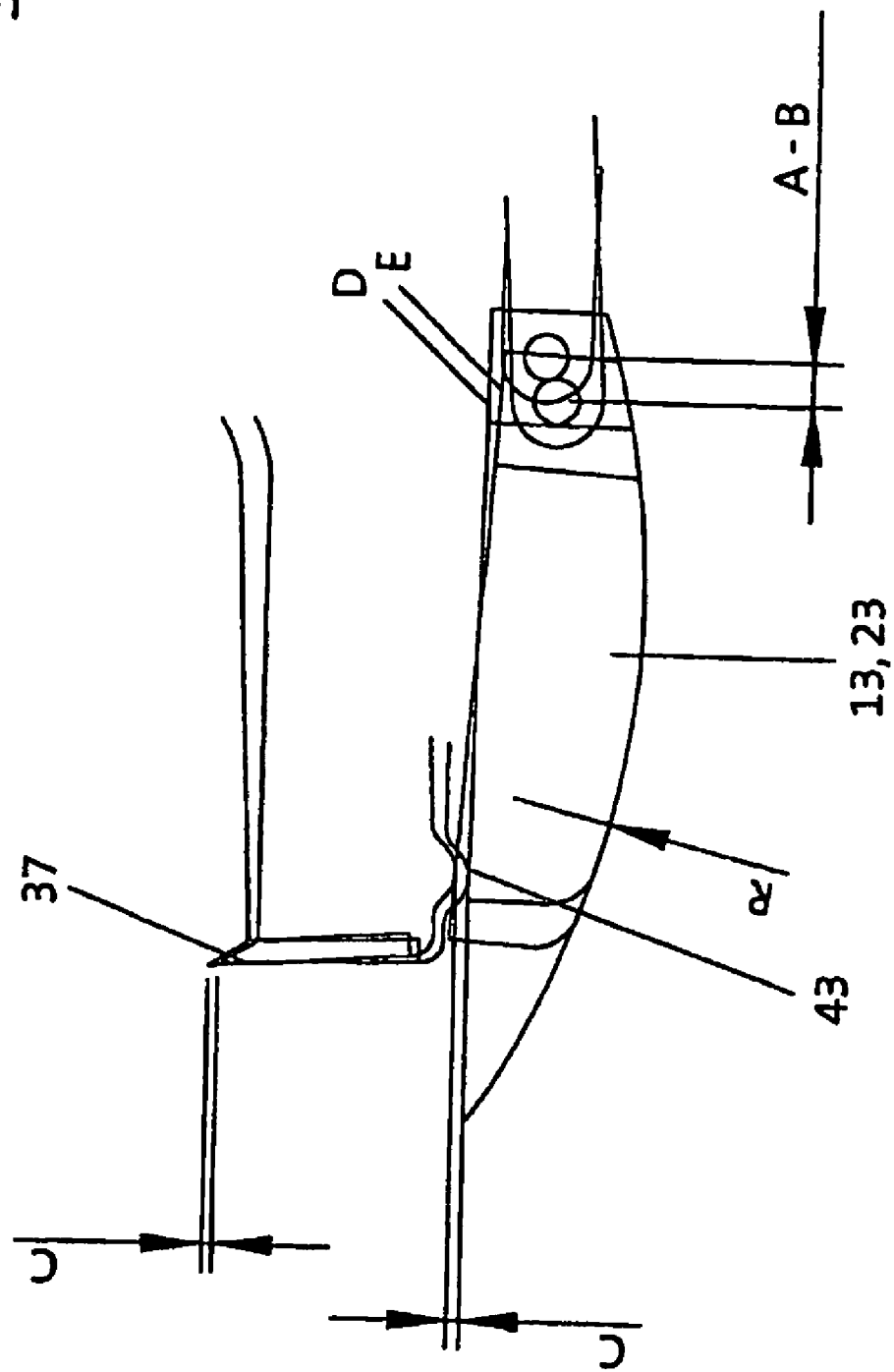
FIG. 3a is a principle drawing of the longitudinal displacement of a sliding wedge.

This displacement causes the cutter jaws to be closed by the adjustment amount C and simultaneously the angular position of the first sliding wedge 13 from the position E to position D to be changed (see FIG. 3).

Simultaneously with this, pivoting of the jaw part 3 results via the second sliding wedge 23 that is attached via the second coupling rod 29 to the first plier arm 1, so that a relative movement of the second sliding wedge 23 with respect to the jaw part 3 in the same direction as for the first sliding wedge 13.

Thus, an adjusting movement of the cutter jaw 41 perpendicular to the longitudinal displacement by the amount C and the positional correction of the second sliding wedge 23 from E to D. Selection of the back radius R of the sliding wedges 13, 23 taken from FIG. 3 allows optimization of the adjustment amount C and the positional correction for varying applications.

In the further progression, stripping of insulation from the conductor occurs in that the cutter jaws 37, 39 are drawn via the pull rod 43 toward the center of the plier by the movement of the link 9 against the pull spring 49.

During stripping, a point-shaped arrangement of the cutter jaws 41 arises on the sliding-wedge surfaces 15, 25. This arrangement is realized by means of a first projection 51 on the side of the cutter jaws 41 facing the sliding-wedge surfaces 15, 25. Also, a second projection 53 exists on the same cutter-jaw side. This second projection 53 centers the central setting of the moving cutter jaws 41. For this purpose, a slot 55 is provided in the pull rod 43 so that both cutter jaws 41 may be positioned uniformly against the gripper jaws 33.

In an advantageous embodiment example, a slight obliqueness of the sliding-wedge surfaces 15, 25 is caused by the shape of the second surfaces 17, 27 when the sliding wedges 13, 23 are displaced longitudinally. As the cutter jaws 41 glide along, a minimal opening of the cutter jaws 41 and the attached cutter blade 37 results.

Figure 5:
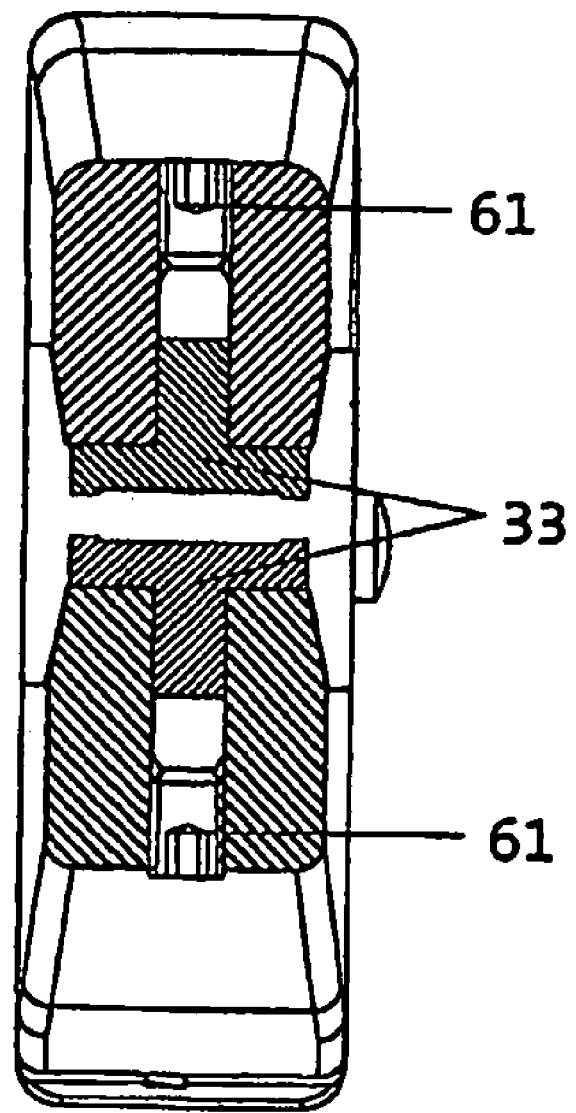
FIG. 5a is a detailed view of gripper jaws with receiver jaws.

FIG. 4 shows a detailed view of a plier jaw. Each of the gripper jaws 33 includes a raised gripper tooth 47. As FIG. 5 shows, the gripper jaws may be implemented as a tap receiver or as two parallel flat columns. A thickening 57 is located on the taps or flat columns that guarantees a clamping in the receiver jaws 59. A height adjustment of the gripper jaws 33 is possible via a set screw 61. This adjustment is usually set at the factory.

FIG. 6 shows that a securing pin 63 serves to secure the position of the sliding wedges 13, 23. The sliding wedges 13, 23 are thus secured against undesired alteration of position by any conceivable load.

| Reference Index List: | |
|---|---|
| 1 | first plier arm |
| 3 | Jaw part |
| 5 | pivot point |
| 7 | second plier arm |
| 8 | Lever pivot axis |
| 9 | Link |
| 11 | Roller |
| 13 | first sliding wedge |
| 15 | first sliding-wedge surface of the first sliding wedge |
| 17 | second sliding-wedge surface of the first sliding wedge |
| 19 | first coupling rod |
| 21 | first pin |
| 23 | second sliding wedge |
| 25 | first sliding-wedge surface of the second sliding wedge |
| 27 | second sliding-wedge surface of the second sliding wedge |
| 29 | second coupling rod |
| 31 | second pin |
| 33 | Gripper jaw |
| 37 | Cutter blade |
| 41 | Cutter jaw |
| 43 | Pull rod |
| 45 | Wire cutter |
| 47 | Raised gripper tooth |
| 49 | Pull spring |
| 51 | first projection |
| 53 | second projection |
| 55 | Slot |
| 57 | Thickening |
| 59 | Receiver jaws |
| 61 | Set screw |
| 63 | securing pin |

The invention claimed is:

1. A wire-stripping plier comprising:
automatic adaptation to various wire gauges and insulation thicknesses with two pairs of pivotable jaws of which the jaws of a first, outer pair are configured as gripper jaws (33) which are pivotable by means of a first jaw arm (1) and a jaw part (3) about a common pivot point (5), and the jaws of the other, inner pair that are configured as cutting jaws (41) with blades that cut into the insulation, and with a pull rod (43) attached to the cutter jaws (41) and longitudinally moveable within the jaw body providing the stripping motion that is coupled with a second plier arm (7) via a link (9), wherein at least one sliding wedge (13, 23) is mounted in a recess shaped to match the sliding wedge (13, 23) within the first plier arm (1) or in the jaw part (3), whereby a first sliding wedge (15, 25) facing the cutting jaws is flat and a second sliding wedge (17, 27) resting in the recess is so shaped that the separation between both sliding wedges at a central area of the sliding wedge (13, 23) diminishes toward at least one of the two sliding wedge ends, and wherein squeezing the wire-stripping plier causes longitudinal displacement of the sliding wedge (13, 23) along with simultaneous matching of position of the sliding wedge (13, 23) perpendicular to the longitudinal direction that results in cutting-depth adjustment of the cutting jaws (41) and the cutting blade (37) attached to it.

2. A wire-stripping plier according to claim 1, wherein a first sliding wedge (13) is mounted in a first recess in the first plier arm (1), and a second sliding wedge (23) is mounted in a recess in the jaw part (3), and wherein the second surfaces (17, 27) of the sliding wedge (13, 23) are bow-shaped.

3. A wire-stripping plier according to claim 2, wherein the first sliding wedge (13) is connected with the jaw part (3) and the second sliding wedge (23) is connected with the first plier arm (1) via a second coupling rod (29), and that, when the wire-stripping plier is compressed, the jaw part (3) is displaced longitudinally, while simultaneously the second coupling rod (29) holds the second sliding wedge (23) firmly, the jaw part (3) is extended outward by the movement about the second sliding wedge (23) and thus corresponding adaptation of the second sliding wedge (23) results from this relative displacement.

4. A wire-stripping plier according to claim 1, wherein the side of the cutter jaws (41) facing the sliding wedge (13, 23) includes a first projection (51) to create a point-shaped arrangement of the cutter jaws (41) on the sliding-wedge surface (15, 25) and a second projection (53) that centers the middle position of the moving cutter jaws.

5. A wire-stripping plier according to claim 1, wherein each of the gripper jaws (33) possesses a raised gripper tooth (47), and wherein the raised gripper tooth (47) and the cutter blade (37) include one-sided mirror-image angled cutting strips.

6. A wire-stripping plier according to claim 1, wherein the shape of the second surfaces (17, 27) causes a slight longitudinal displacement of the sliding-wedge surfaces (17, 27), which leads to a slight opening of the cutter blades (37) as the cutter jaws (41) glide during the stripping process.

7. A wire-stripping plier according to claim 1, wherein the cutter blade (37) is attached to the cutter-jaw holders (41) so that it may be removed.

8. A wire-stripping plier according to claim 1, wherein the gripper jaws (33) are mounted in receiver jaws (59) so that they may be removed, and wherein the separation of the gripper jaws (33) is adjustable with respect to the gripping plane.

9. A wire-stripping plier according to claim 1, wherein a wire cutter (45) is positioned between the first plier arm (1) and the second plier arm (7).

* * * * *